(12) United States Patent
Shanklin et al.

(10) Patent No.: US 11,932,334 B2
(45) Date of Patent: Mar. 19, 2024

(54) TRAILER MOUNTABLE STORAGE CONTAINER ASSEMBLY

(71) Applicants: Ronnie Shanklin, Stockbridge, GA (US); Kevin Walcott, Stockbridge, GA (US)

(72) Inventors: Ronnie Shanklin, Stockbridge, GA (US); Kevin Walcott, Stockbridge, GA (US)

(*) Notice: Subject to any disclaimer, the term of this patent is extended or adjusted under 35 U.S.C. 154(b) by 490 days.

(21) Appl. No.: 17/218,833

(22) Filed: Mar. 31, 2021

(65) Prior Publication Data

US 2022/0315139 A1 Oct. 6, 2022

(51) Int. Cl.
*B62D 63/08* (2006.01)
*B25H 3/02* (2006.01)
*B25H 5/00* (2006.01)

(52) U.S. Cl.
CPC .............. *B62D 63/08* (2013.01); *B25H 3/022* (2013.01); *B25H 5/00* (2013.01)

(58) Field of Classification Search
CPC ........... B25H 5/00; B25H 3/022; B65D 63/08
USPC ........................................................ 220/485
See application file for complete search history.

(56) References Cited

U.S. PATENT DOCUMENTS

| | | | |
|---|---|---|---|
| 2,038,932 A | 4/1936 | Haupt | |
| 4,753,495 A * | 6/1988 | Swink | A47F 5/0815 312/265.5 |
| 4,938,398 A | 7/1990 | Hallson | |
| 4,938,399 A * | 7/1990 | Hull | B60R 9/06 280/415.1 |
| 5,383,698 A * | 1/1995 | Buchholz | B60P 3/14 296/26.03 |
| 5,383,703 A * | 1/1995 | Irvine, III | B62D 63/061 296/24.45 |
| 5,419,476 A | 5/1995 | White | |
| 6,910,609 B2 | 6/2005 | Williams | |
| D515,314 S * | 2/2006 | Stantial | D3/905 |
| 7,044,178 B1 * | 5/2006 | Campbell | B25H 1/12 144/286.5 |
| 7,963,621 B1 * | 6/2011 | Ellis | B25H 3/04 312/242 |
| 8,267,363 B2 * | 9/2012 | Begic | F16M 13/02 248/221.11 |
| 8,281,967 B2 * | 10/2012 | Evans | B60R 9/00 224/543 |

(Continued)

OTHER PUBLICATIONS

Texas Trailer Supply, p. 3, Tandem Axle Landscape trailers, Jul. 26, 2019, Waybackmachine, (Year: 2019).*

*Primary Examiner* — Ernesto A Grano

(57) ABSTRACT

A trailer mountable storage container assembly for securely stowing articles on a trailer includes a box, which is mountable to the trailer. A door is hingedly engaged to the box and is positioned to selectively close a front of the box, which is open. The door is lockable to secure contents of the box. A plurality of rails is positioned in the box and is engaged to a back thereof. Each rail extends from proximate to opposed sides of the box and has a channel positioned longitudinally therein. Each of a plurality of hooks is selectively insertable into a respective channel so that the hook is slidably engaged to an associated rail. Items, such as tools, equipment, and the like, can be hung from the hooks and positioned in the box.

20 Claims, 8 Drawing Sheets

(56) References Cited

U.S. PATENT DOCUMENTS

| | | | | |
|---|---|---|---|---|
| 8,317,254 | B2* | 11/2012 | Scott-Greavu | B60P 3/36 296/168 |
| 8,465,085 | B1* | 6/2013 | Tradup | B62D 63/061 296/186.4 |
| 8,562,011 | B1* | 10/2013 | Smith | B60P 3/14 296/156 |
| 8,668,209 | B1* | 3/2014 | Anzivino | B62B 1/002 280/47.12 |
| 8,857,684 | B1 | 10/2014 | Calvert | |
| 9,180,591 | B2* | 11/2015 | McLean | A47B 83/001 |
| 10,160,373 | B2* | 12/2018 | Tovornik | B60P 3/14 |
| 10,165,872 | B2* | 1/2019 | Jones | A47F 5/0823 |
| D840,715 | S * | 2/2019 | Löwenhielm | D6/553 |
| 2002/0117945 | A1* | 8/2002 | Norman | A47B 43/00 312/315 |
| 2002/0153747 | A1* | 10/2002 | Ropp | B60P 3/14 296/24.45 |
| 2003/0107307 | A1* | 6/2003 | Chen | A47B 46/00 312/289 |
| 2005/0016943 | A1* | 1/2005 | Dick | A47F 5/0815 211/189 |
| 2007/0151302 | A1* | 7/2007 | Kendall | D06F 29/005 68/3 R |
| 2010/0013257 | A1 | 1/2010 | Bernart | |
| 2017/0355294 | A1* | 12/2017 | Bisson | B60P 1/52 |
| 2018/0245737 | A1* | 8/2018 | Pearson | F16M 3/00 |
| 2020/0156555 | A1* | 5/2020 | Reed, III | B60R 11/06 |
| 2020/0290524 | A1* | 9/2020 | Klatt | B60P 3/14 |
| 2022/0033016 | A1* | 2/2022 | Baker | B62D 33/027 |
| 2023/0173991 | A1* | 6/2023 | Warn | B62D 63/064 414/462 |

* cited by examiner

TRAILER MOUNTABLE STORAGE CONTAINER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to storage container assemblies and more particularly pertains to a new storage container assembly for securely stowing articles on a trailer.

(2) Description of Related Art Including Information Disclosed Under 37 CFR 1.97 and 1.98

The prior art relates to storage container assemblies for trailers, which may comprise containers selectively engageable to rails of trailers.

BRIEF SUMMARY OF THE INVENTION

An embodiment of the disclosure meets the needs presented above by generally comprising a box, which is configured to be mountable to a trailer. A door is hingedly engaged to the box and is positioned to selectively close a front of the box, which is open. The door is lockable and thus is configured to secure contents of the box. A plurality of rails is positioned in the box and is engaged to a back thereof. Each rail extends from proximate to opposed sides of the box and has a channel positioned longitudinally therein. Each of a plurality of hooks is selectively insertable into a respective channel so that the hook is slidably engaged to an associated rail. The hooks are configured to hang items, such as tools, equipment, and the like.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
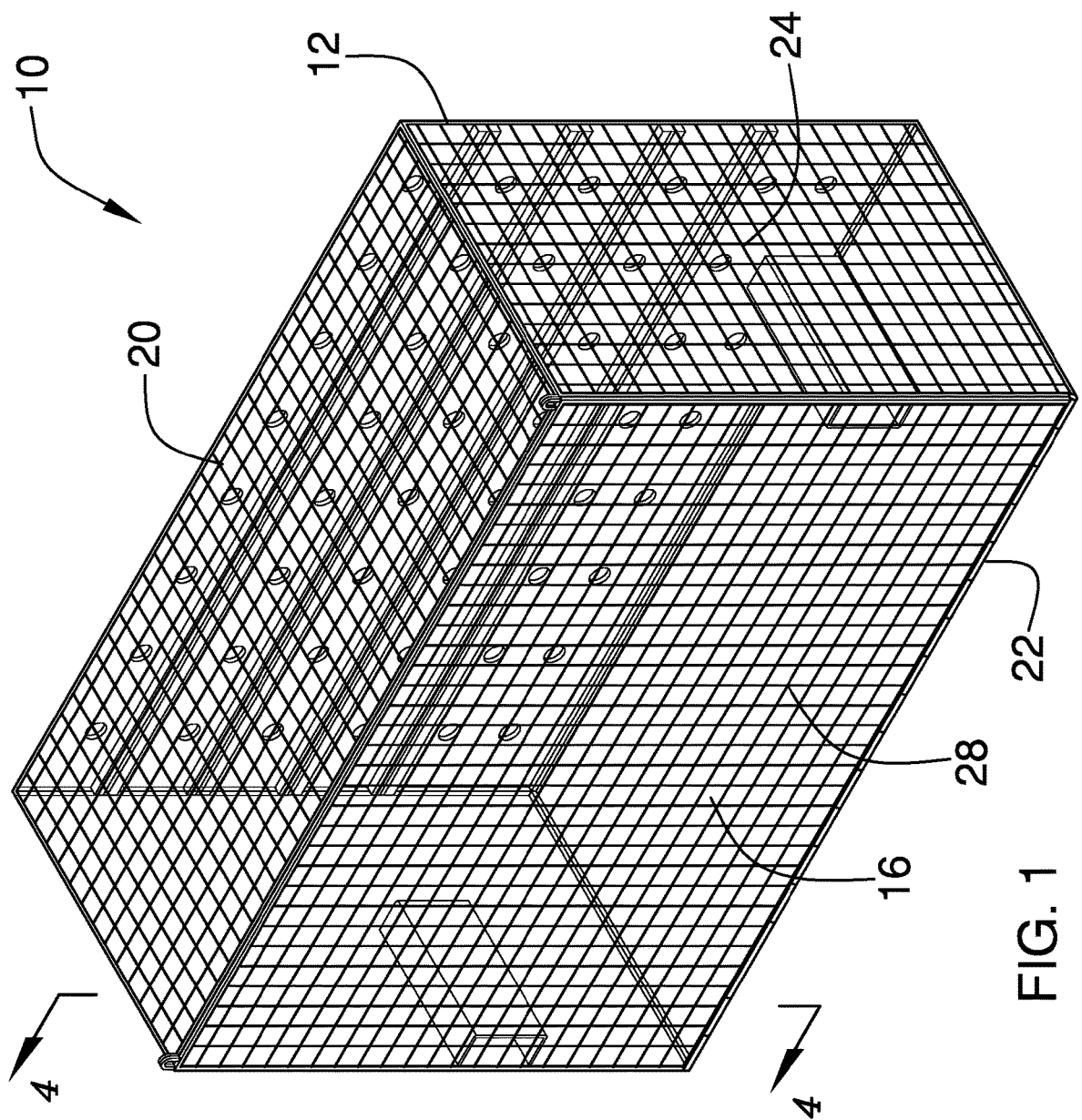
FIG. 1 is a front isometric perspective view of a trailer mountable storage container assembly according to an embodiment of the disclosure.

With reference now to the drawings, and in particular to FIGS. 1 through 8 thereof, a new storage container assembly embodying the principles and concepts of an embodiment of the disclosure and generally designated by the reference numeral 10 will be described.

Figure 2:
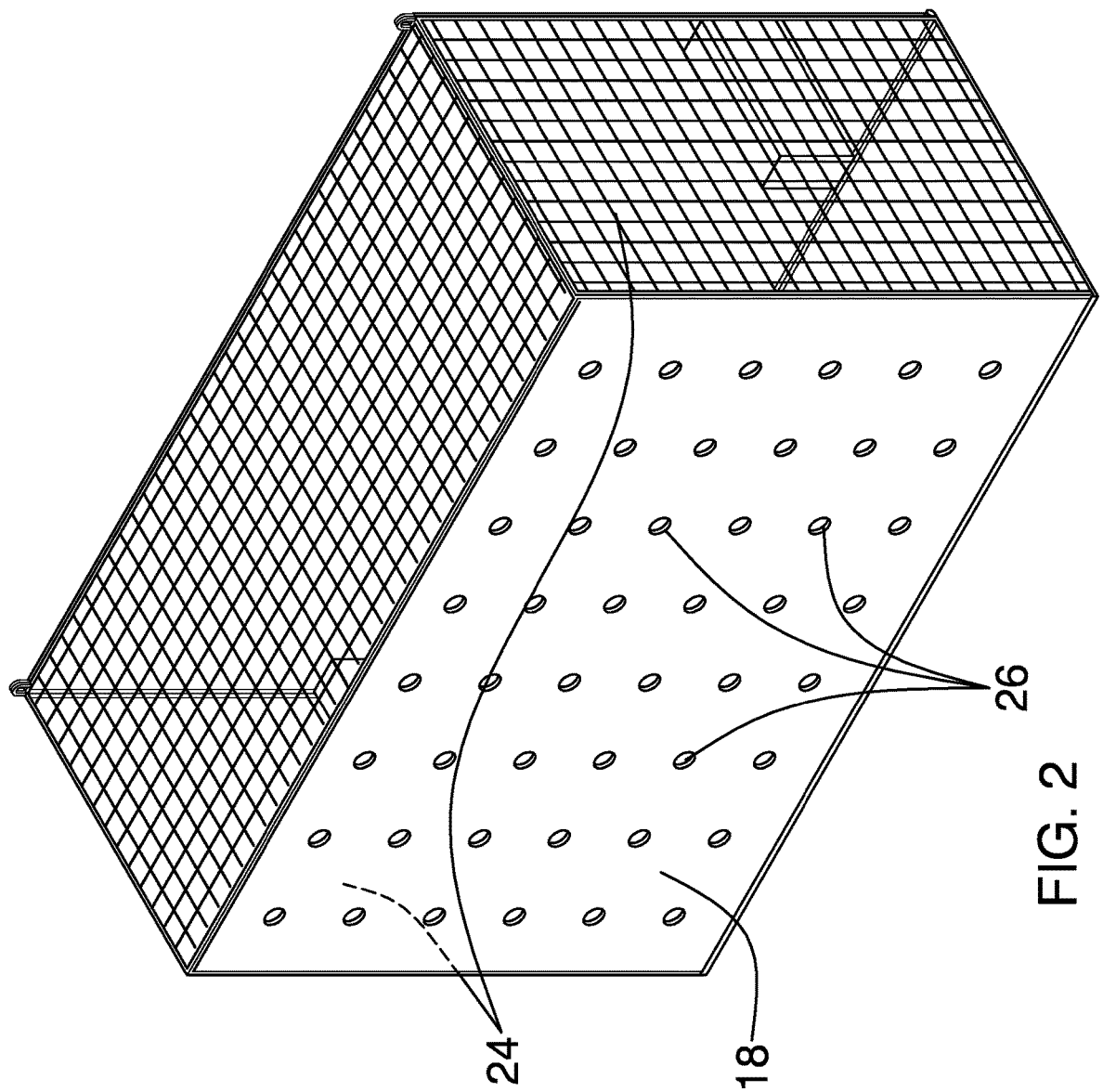
FIG. 2 is a rear isometric perspective view of an embodiment of the disclosure.
Figure 5:
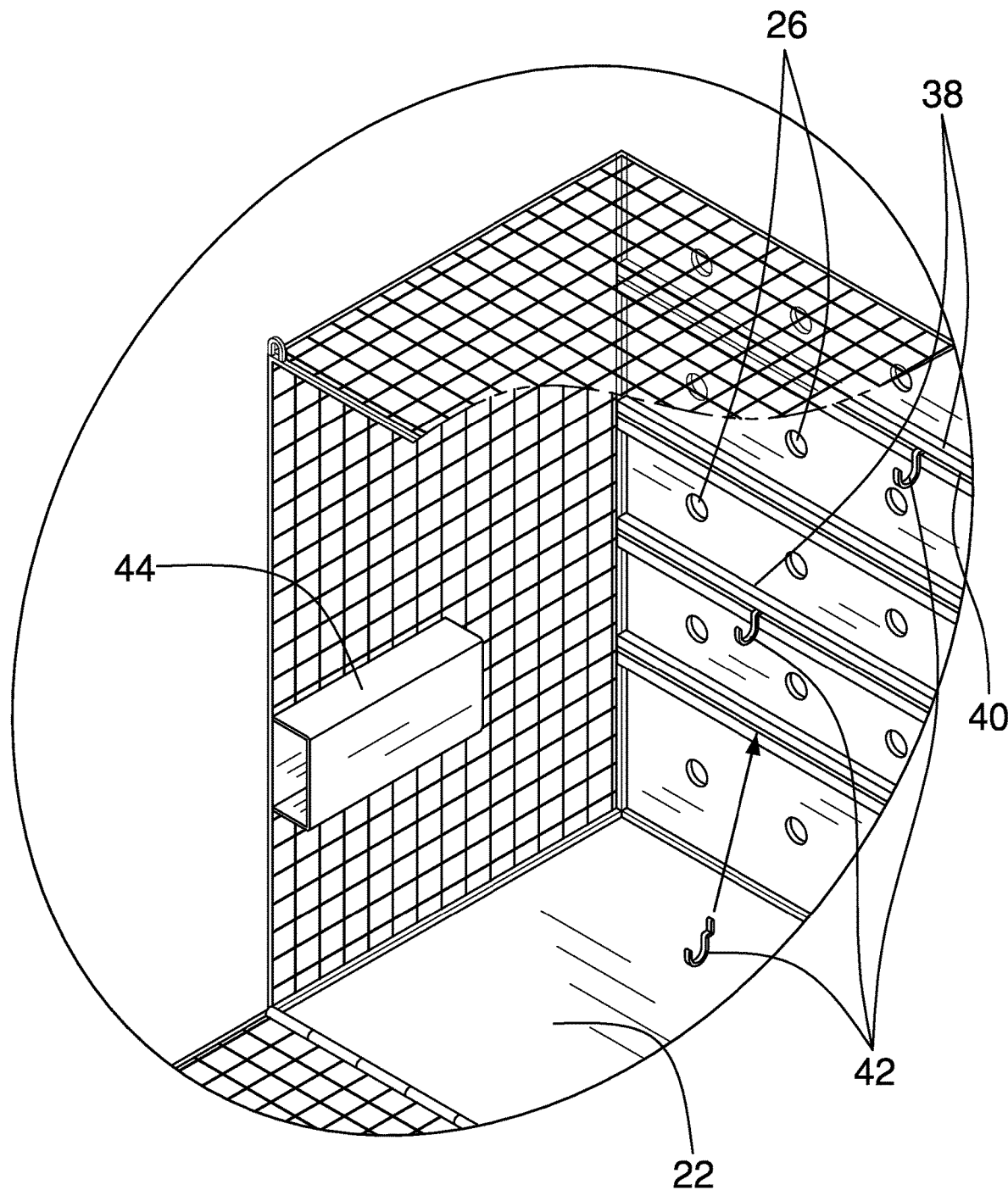
FIG. 5 is a detail view of an embodiment of the disclosure.
Figure 6:
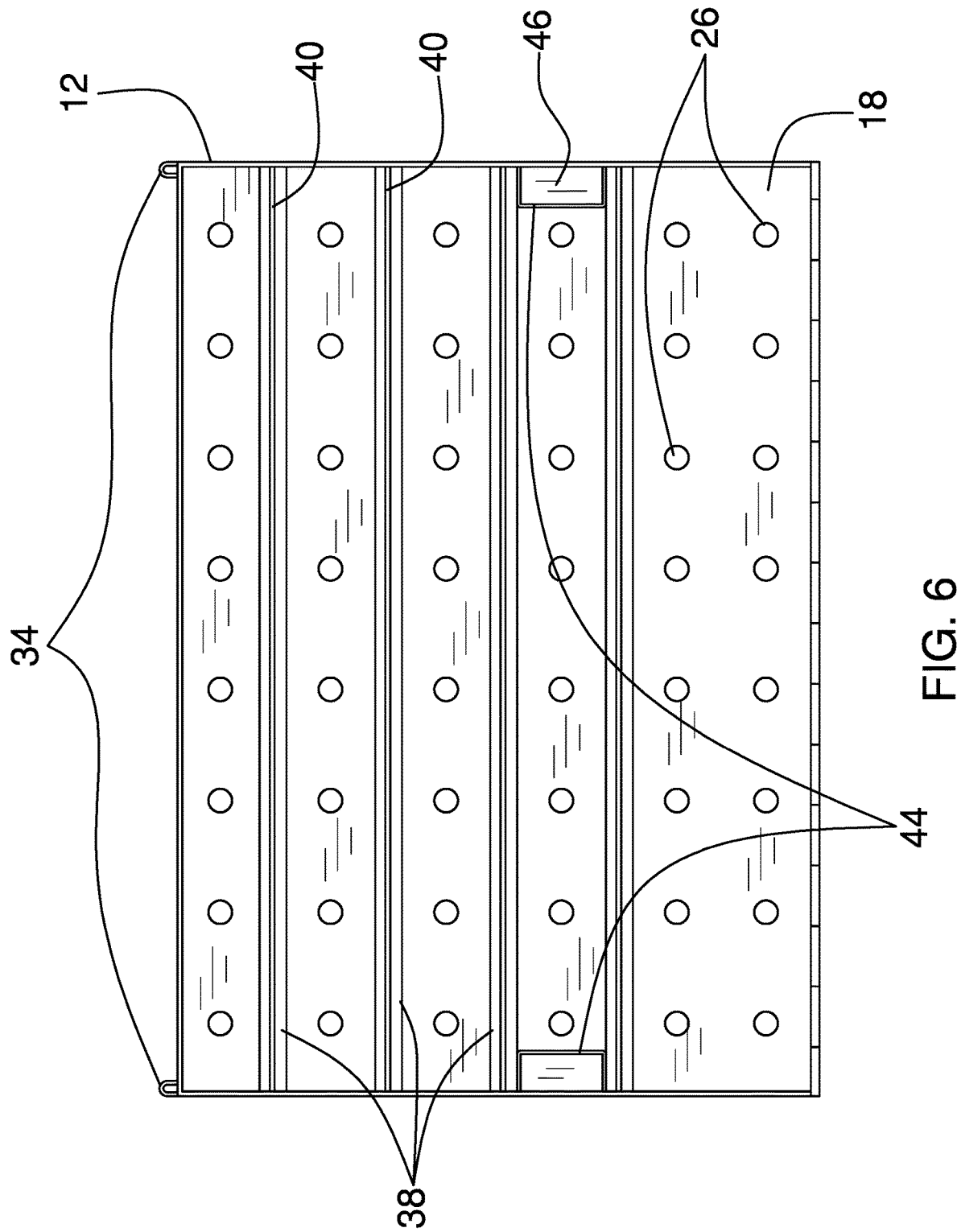
FIG. 6 is a detail view of an embodiment of the disclosure.
Figure 7:
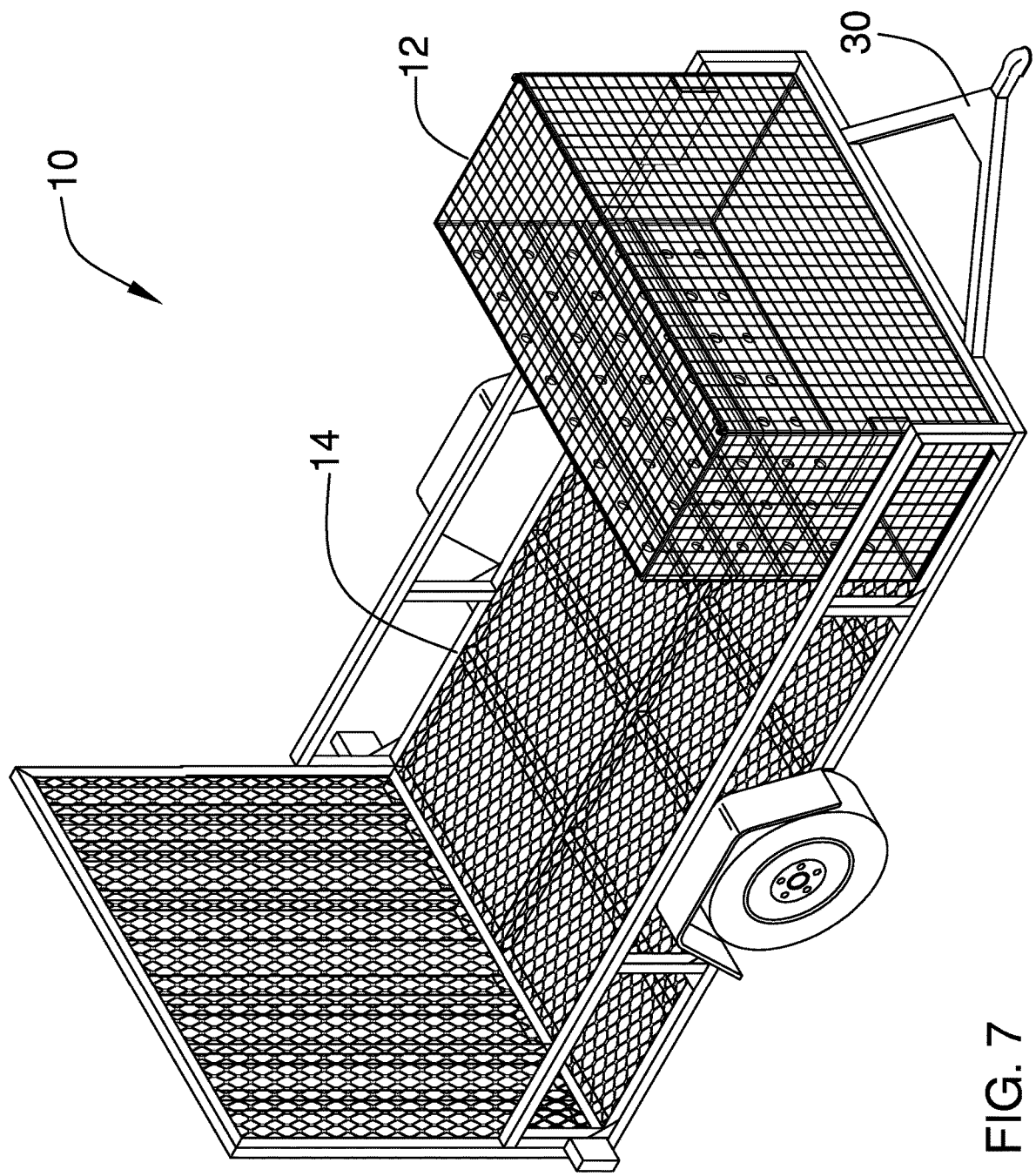
FIG. 7 is an in-use view of an embodiment of the disclosure.
Figure 8:
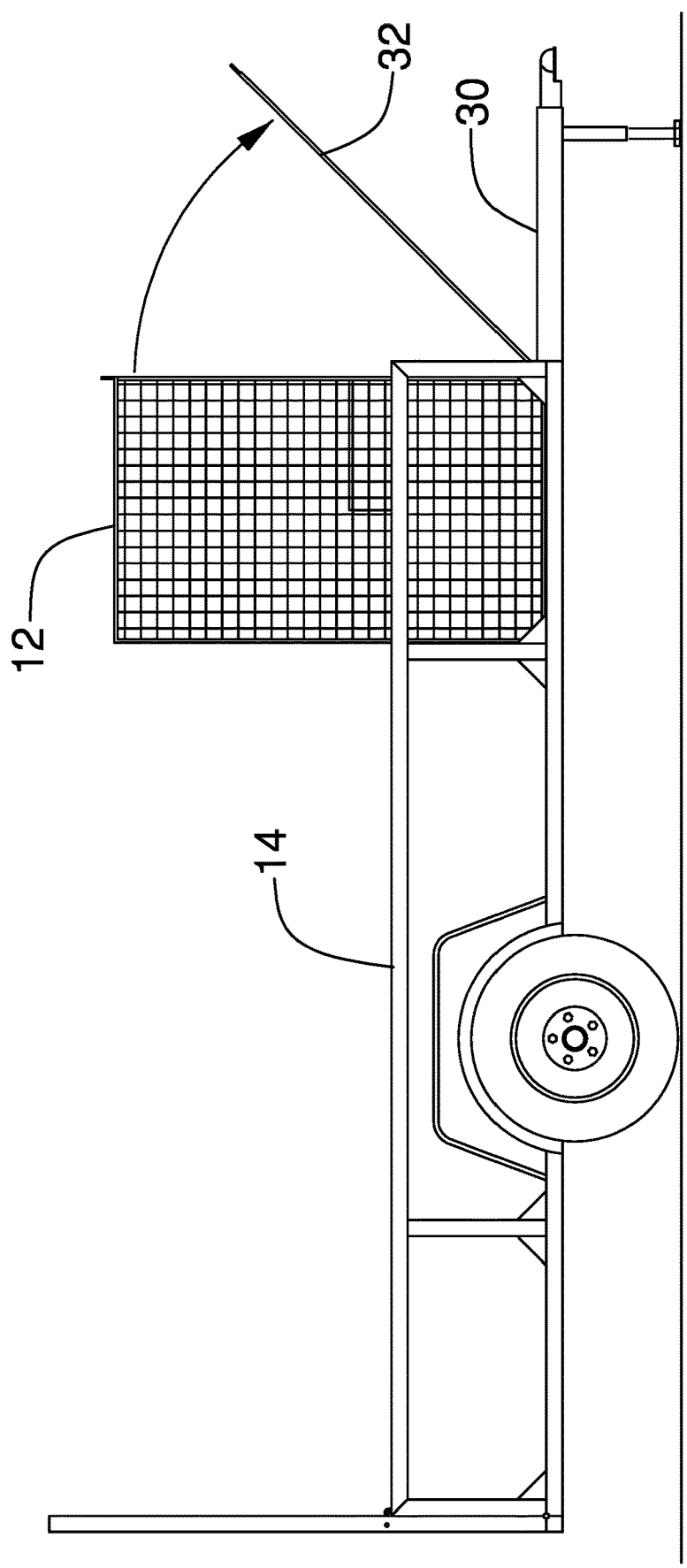
FIG. 8 is an in-use view of an embodiment of the disclosure.

As best illustrated in FIGS. 1 through 8, the trailer mountable storage container assembly 10 generally comprises a box 12, which is configured to be mountable to a trailer 14, as shown in FIGS. 7 and 8. The box 12 can be welded to the trailer 14, affixed with brackets, or attached using other attachment means. The box 12 has a front 16, a back 18, a top 20, a bottom 22, and opposed sides 24. The front 16 is open. The back 18 and the bottom 22 comprise sheet metal. The back 18 has a plurality of apertures 26 positioned therein, as shown in FIG. 2. The apertures 26 are configured for passage of air to lower the wind resistance of the assembly 10.

A door 28 is hingedly engaged to the box 12 and is positioned to selectively close the front 16. The door 28 is lockable and thus is configured to secure contents of the box 12. The door 28, the top 20, and the opposed sides 24 comprise expanded metal sheet. The door 28, the back 18, the top 20, the bottom 22, and the opposed sides 24 of the box 12 each have a thickness of at least 0.56 millimeters. The door 28 is hingedly engaged to the bottom 22 so that the door 28 is positioned to open downwardly. The door 28 is configured to engage a tongue 30 of the trailer 14, as shown in FIG. 8, so that the door 28 is supported in a substantially horizontal configuration. The door 28 therefore can be utilized as a work bench 32.

A pair of first rings 34 is engaged to the box 12 proximate to the front 16. A pair of second rings 36 is engaged to the door 28. Each second ring 36 is aligned with an associated first ring 34 when the door 28 is in a closed configuration, as shown in FIG. 5. The second ring 36 and the associated first ring 34 are configured for insertion of a shackle of a respective padlock (not shown) to lock the door 28.

A plurality of rails 38 is positioned in the box 12 and is engaged to the back 18. Each rail 38 extends from proximate to the opposed sides 24 of the box 12 and has a channel 40 positioned longitudinally therein. The plurality of rails 38 comprises from two to five rails 38. The plurality of rails 38 may comprise four rails 38, as shown in FIG. 6.

Each of a plurality of hooks 42 is selectively insertable into a respective channel 40 so that the hook 42 is slidably engaged to an associated rail 38. The hooks 42 are configured to hang items, such as tools, equipment, and the like.

Figure 3:
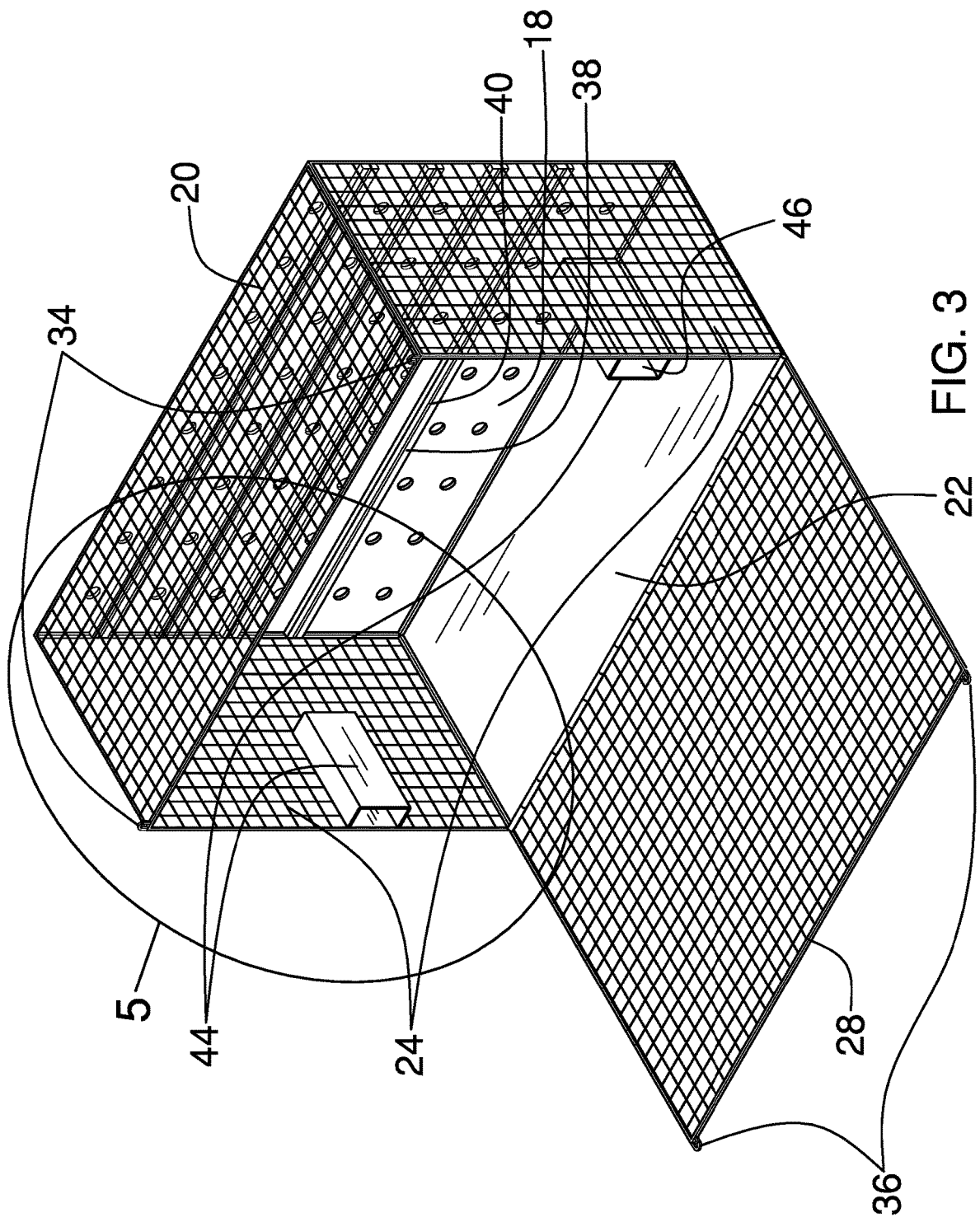
FIG. 3 is a front isometric perspective view of an embodiment of the disclosure.
Figure 4:
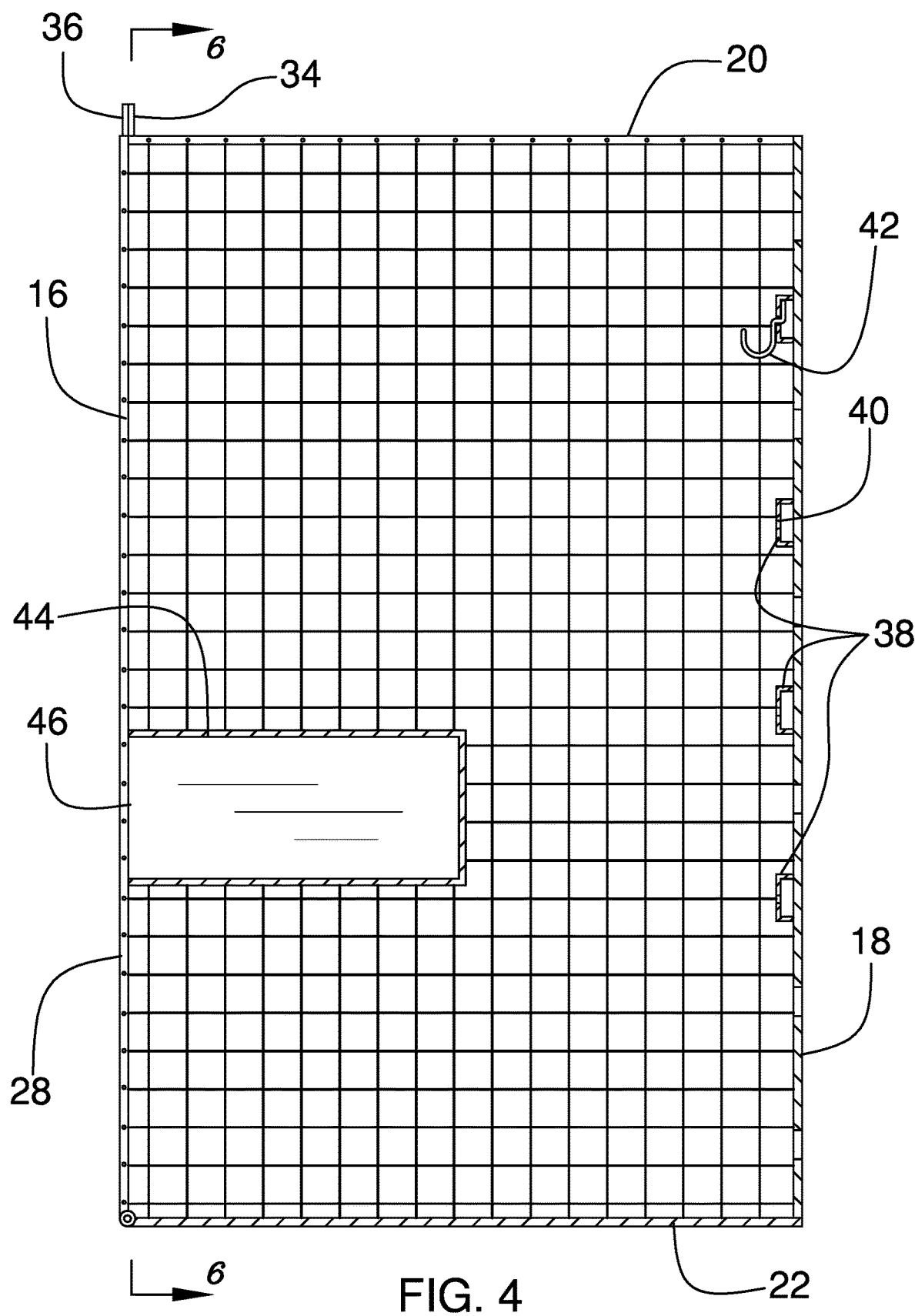
FIG. 4 is a side view of an embodiment of the disclosure.

A plurality of bins 44 is engaged to and positioned within the box 12. The bins 44 are configured to position articles, such as smaller tools. Each bin 44 has a forward face 46, which is open, allowing the articles to be inserted into the bin 44 from the forward face 46. The door 28 closes the forward face 46 along with the front 16 of the box 12 when in the closed configuration. The plurality of bins 44 may comprise two bins 44, which are engaged singly to the opposed sides 24 of the box 12, as shown in FIG. 3.

In use, the box 12 is affixed to the trailer 14 and utilized for stowing tools, equipment, and the like, which can be hung from the hooks 42 and stowed in the bins 44. When not in the vicinity of the trailer 14, a user can secure the contents of the box 12 by affixing a respective padlock into each first ring 34 and its associated second ring 36.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

We claim:

1. A trailer mountable storage container assembly comprising:
   a box configured to be mountable to a trailer, the box having a front, the front being open,
   a door hingedly engaged to the box such that the door is positioned for selectively closing the front, the door being lockable wherein the door is configured for securing contents of the box;
   a plurality of rails positioned in the box and engaged to a back thereof, each rail extending from proximate to opposed sides of the box, each rail having a channel positioned longitudinally therein;
   a plurality of hooks, each hook being selectively insertable into a respective channel such that the hook is slidably engaged to an associated rail, wherein the hooks are configured for hanging items; and
   a bin engaged to and positioned within the box, the bin being configured for positioning articles therein, the bin having a forward face, the forward face being open, the forward face being covered by the door when the door is positioned in a closed configuration.

2. The trailer mountable storage container assembly of claim 1, wherein:
   the back and a bottom of the box comprise sheet metal; and
   a top of the box, the opposed sides of the box, and the door comprise expanded metal sheet.

3. The trailer mountable storage container assembly of claim 2, wherein the back has a plurality of apertures positioned therein, wherein the apertures are configured for passage of air.

4. The trailer mountable storage container assembly of claim 2, wherein the door, the back, the top, the bottom, and the opposed sides of the box each have a thickness of at least 0.56 millimeters.

5. The trailer mountable storage container assembly of claim 1, wherein the door is hingedly engaged to a bottom of the box such that the door is positioned for opening downwardly, wherein the door is configured for engaging a tongue of the trailer such that the door is supported in a substantially horizontal configuration.

6. The trailer mountable storage container assembly of claim 1, further including:
   a pair of first rings engaged to the box proximate to the front; and
   a pair of second rings engaged to the door, such that, each second ring is aligned with an associated first ring when the door is in the closed configuration, wherein the second ring and the associated first ring are configured for insertion of a shackle of a respective padlock for locking the door.

7. The trailer mountable storage container assembly of claim 1, wherein the plurality of rails comprises from two to five rails.

8. The trailer mountable storage container assembly of claim 7, wherein the plurality of rails comprises four rails.

9. The trailer mountable storage container assembly of claim 1, wherein the bin is one of a plurality of bins engaged to and positioned within the box, wherein the bins are configured for positioning articles, each bin having a forward face, the forward face being open, the forward face of each bin being covered by the door when the door is positioned in the closed configuration.

10. The trailer mountable storage container assembly of claim 9, wherein the forward face of each bin is oriented coplanar to the front of the box.

11. The trailer mountable storage container assembly of claim 9, wherein the plurality of bins comprises two bins engaged singly to the opposed sides of the box.

12. A trailer and trailer mountable storage container assembly combination comprising:
   a trailer having a tongue extending therefrom;
   a box mounted to a trailer, the box having a front, the front being open,
   a door hingedly engaged to the box such that the door is positioned for selectively closing the front, the door being lockable wherein the door is configured for securing contents of the box;
   a plurality of rails positioned in the box and engaged to a back thereof, each rail extending from proximate to opposed sides of the box, each rail having a channel positioned longitudinally therein; and a plurality of hooks, each hook being selectively insertable into a respective channel such that the hook is slidably engaged to an associated rail, wherein the hooks are configured for hanging items; and a bin engaged to and positioned within the box, the bin being configured for positioning articles therein, the bin having a forward face, the forward face being open, the forward face being covered by the door when the door is positioned in a closed configuration.

13. The trailer and trailer mountable storage container assembly combination of claim 12, wherein:

the back and a bottom of the box comprise sheet metal;

the back has a plurality of apertures positioned therein, wherein the apertures are configured for passage of air; and a top of the box, the opposed sides of the box, and the door comprise expanded metal sheet; and the door, the back, the top, the bottom, and the opposed sides of the box each have a thickness of at least 0.56 millimeters.

14. The trailer and trailer mountable storage container assembly combination of claim 12, wherein the door is hingedly engaged to a bottom of the box such that the door is positioned for opening downwardly, wherein the door is configured for engaging a tongue of the trailer such that the door is supported in a substantially horizontal configuration.

15. The trader and trailer mountable storage container assembly combination of claim 12, further including:

a pair of first rings engaged to the box proximate to the front; and a pair of second rings engaged to the door, such that each second ring is aligned with an associated first ring when the door is in the closed configuration, wherein the second ring and the associated first ring are configured for insertion of a shackle of a respective padlock for locking the door.

16. The trader and trailer mountable storage container assembly combination of claim 12, wherein the plurality of rails comprises four rails.

17. The trailer and trailer mountable storage container assembly combination of claim 12, wherein the bin is one of a plurality of bins engaged to and positioned within the box, wherein the bins are configured for positioning articles, each bin having a forward face, the forward face being open, the forward face of each bin being covered by the door when the door is positioned in the closed configuration.

18. The trailer and trailer mountable storage container assembly combination of claim 17, wherein the forward face of each bin is oriented coplanar to the front of the box.

19. The trailer and trailer mountable storage container assembly combination of claim 18, wherein the plurality of bins comprises two bins engaged singly to the opposed sides of the box.

20. A trailer mountable storage container assembly comprising:

a box configured to be mountable to a trailer, the box having a front, a back, a top, a bottom, and opposed sides, the front being open, the back and the bottom comprising sheet metal, the back having a plurality of apertures positioned therein, wherein the apertures are configured for passage of air;

a door hingedly engaged to the box such that the door is positioned for selectively;

closing the front, the door being lockable wherein the door is configured for securing contents of the box, the door, the top, and the opposed sides comprising expanded metal sheet, the door, the back, the top, the bottom, and the opposed sides of the box each having a thickness of at least 0.56 millimeters, the door being hingedly engaged to the bottom such that the door is positioned for opening downwardly, wherein the door is configured for engaging a tongue of the trailer such that the door is supported in a substantially horizontal configuration;

a pair of first rings engaged to the box proximate to the front;

a pair of second rings engaged to the door, such that each second ring is aligned with an associated first ring when the door is in a closed configuration, wherein the second ring and the associated first ring are configured for insertion of a shackle of a respective padlock for locking the door;

a plurality of rails positioned in the box and engaged to the back, each rail extending from proximate to the opposed sides of the box, each rail having a channel positioned longitudinally therein, the plurality of rails comprising from two to five rails, the plurality of rails comprising four rails;

a plurality of hooks, each hook being selectively insertable into a respective channel such that the hook is slidably engaged to an associated rail, wherein the hooks are configured for hanging items; and a plurality of bins engaged to and positioned within the box, wherein the bins are configured for positioning articles, each bin having a forward face, the forward face being open, the forward face of each bin being covered by the door when the door is positioned in the closed configuration, the forward face of each bin being oriented coplanar to the front of the box, the plurality of bins comprising two bins engaged singly to the opposed sides of the box.

* * * * *